(12) United States Patent
Hollowell et al.

(10) Patent No.: US 12,728,849 B2
(45) Date of Patent: Sep. 8, 2026

(54) SYSTEM AND METHOD FOR OPERATING LANE DEPARTURE WARNING BASED ON RUMBLE STRIP SENSING

(71) Applicant: FCA US LLC, Auburn Hills, MI (US)

(72) Inventors: James R Hollowell, Auburn Hills, MI (US); Zachary C Rogalski, II, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 238 days.

(21) Appl. No.: 18/755,785

(22) Filed: Jun. 27, 2024

(65) Prior Publication Data

US 2026/0001536 A1 Jan. 1, 2026

(51) Int. Cl.

*B60W 30/12* (2020.01)
*B60W 10/20* (2006.01)
*B60W 50/14* (2020.01)

(52) U.S. Cl.

CPC ............ *B60W 30/12* (2013.01); *B60W 10/20* (2013.01); *B60W 50/14* (2013.01); *B60W 2520/28* (2013.01)

(58) Field of Classification Search

CPC ...... B60W 10/20; B60W 30/12; B60W 50/08; B60W 50/14; B60W 2030/1809; B60W 2420/90

See application file for complete search history.

(56) References Cited

U.S. PATENT DOCUMENTS 8,248,219 B2 * 8/2012 Sato ..................... B62D 15/029 340/459
2017/0176592 A1 * 6/2017 Hoare ................. B60W 50/082
2024/0361137 A1 * 10/2024 Aviv .................. G01C 21/3469

FOREIGN PATENT DOCUMENTS

CN 116373880 A * 7/2023 ............ B60W 40/09

* cited by examiner

*Primary Examiner* — John Kwon
(74) *Attorney, Agent, or Firm* — Jeremy J. Klobucar

(57) ABSTRACT

A lane departure warning (LDW) system that implements a corrective action strategy based on driving conditions for a vehicle is provided. The LDW system comprises a drive unit, first, second, third and fourth wheel speed sensors and a controller. The wheel speed sensors provide a wheel speed signal for a respective first, second, third and fourth vehicle wheel. The controller: receives the wheel speed signals from the respective vehicle wheels, wherein each of the wheel speed signals are indicative of a wheel speed of the respective vehicle wheel; and performs the corrective action strategy based on the determination at least one wheel speed signal satisfies the frequency threshold. The corrective action strategy includes one of: (i) communicating a message to a human machine interface (HMI) in the vehicle indicative of a lane departure event; and (ii) communicating a signal to a steering system to provide a corrective steering input.

16 Claims, 4 Drawing Sheets

Start
310
300
320
Lane Keep Active ?
No
Yes

324
Are Lane Lines Visible ?
Yes
No
330
Monitor Wheel Speed Sensors Rumble Strip Detection
340
Is Left Side Rumble Strip Detected ?
No
Yes
342
Is Right Side Rumble Strip Detected ?
No
Yes
350
Send Signed To HMI. Correct Steering to Lane Center
End
360

SYSTEM AND METHOD FOR OPERATING LANE DEPARTURE WARNING BASED ON RUMBLE STRIP SENSING

FIELD

The present disclosure relates generally to a lane departure warning system and related method for operating a lane departure warning system based on sensing of rumble strips.

BACKGROUND

Lane departure warning (LDW) systems are provided in vehicles for alerting a driver of a possible driving path that is outside of a driving lane. Typically the LDW systems operate by using information received by vehicle sensors, such as one or more cameras, that communicate a signal to the LDW system indicative of a driving path outside of a drive lane. The LDW system can interpret the signal and communicate a signal to the driver indicative of the situation. In some examples, the LDW system can communicate a warning message to the driver, such as on a human machine interface (HMI) on the cluster, and/or provide other feedback such as a tactile vibration or other driver interaction such as a vibration on the drivers' seat. In still other reactions, the LDW system can provide a driving correction such as provide a steering input to the steering wheel to correct the projected driving path back into the lane. In general, these LDW systems are dependent upon sensors (cameras) that operate best when visibility is optimal. Sometimes however, visibility is not ideal, such as in bad weather conditions including snow. As such, when the lane lines are not visible, the LDW systems cannot operate and will typically turn off. Thus, there remains a need for improvement in the relevant art.

SUMMARY

In one example aspect, a lane departure warning (LDW) system that implements a corrective action strategy based on driving conditions for a vehicle is provided. The LDW system comprises a drive unit, first, second, third and fourth wheel speed sensors and a controller. The wheel speed sensors provide a wheel speed signal for a respective first, second, third and fourth vehicle wheel. The controller: receives the wheel speed signals from the respective vehicle wheels, wherein each of the wheel speed signals are indicative of a wheel speed of the respective vehicle wheel; and performs the corrective action strategy based on the determination at least one wheel speed signal satisfies the frequency threshold. The corrective action strategy includes one of: (i) communicating a message to a human machine interface (HMI) in the vehicle indicative of a lane departure event; and (ii) communicating a signal to a steering system to provide a corrective steering input.

In another aspect, the controller is configured to determine, based on the wheel speed signals, whether at least one wheel speed signal satisfies a frequency threshold indicative of a lane departure event, the lane departure event indicative of a wheel speed frequency that corresponds to encountering a centerline rumble strip In some implementations, communicating a message to a human machine interface (HMI) comprises communicating a message indicative of the vehicle encountering a centerline lane marker.

In some implementations, communicating a signal to a steering system comprises providing a corrective steering input in a direction away from the detected centerline lane marker.

In some configurations, the controller is configured to determine, based on the wheel speed signals, whether at least one wheel speed signal satisfies a frequency threshold indicative of a lane departure event, the lane departure event indicative of a wheel speed frequency that corresponds to encountering a shoulder rumble strip.

In additional features, communicating a message to a human machine interface (HMI) comprises communicating a message indicative of the vehicle encountering a shoulder lane marker.

In other examples, communicating a signal to a steering system comprises providing a corrective steering input in a direction away from the detected shoulder lane marker.

In other features, the controller is configured to assign a first frequency threshold indicative of a centerline lane departure event and a second frequency threshold indicative of a shoulder lane departure event, wherein the first and second frequency thresholds are distinct and based on a spacing between adjacent rumble strips of the centerline rumble strips and adjacent rumble strips of the shoulder rumble strips.

According to additional examples, a method for implementing a lane departure warning (LDW) system strategy is provided. The method includes: receiving, at a controller, a first, second, third and fourth wheel speed signal for a respective first, second, third and fourth vehicle wheel, wherein each of the wheel speed signals are indicative of a wheel speed of the respective vehicle wheel; and implementing, at the controller, the corrective action strategy, including: determining, based on the wheel speed signals, whether at least one wheel speed signal satisfies a frequency threshold indicative of a lane departure event; and performing the corrective action strategy based on the determination at least one wheel speed signal satisfies the frequency threshold, wherein the corrective action strategy comprises at least one of: (i) communicating a message to a human machine interface (HMI) in the vehicle indicative of a lane departure event; and (ii) communicating a signal to a steering system to provide a corrective steering input.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As identified above, most LDW systems work when good visibility and normal driving conditions exist. However, not all driving conditions are ideal. For example, when poor driving visibility exits, the sensors of the LDW do not function as desired. As such, prior LDW systems exit any lane departure warning routine when poor driving conditions exist leaving the driver to control the vehicle. In addition to a vehicles LDW system, many roads incorporate rumble strips just outside the lane markers to alert a driver that they have moved far from the lane. When the drivers wheels hit the rumble strip, it provides feedback to the driver both tactile (in the steering wheel and the vehicle as a whole), and audile (noise). These rumble strips are provided in many areas to mark both the passenger side (shoulder) lane marker and the driver side (centerline) lane marker. These rumble strips are designed to give a different frequency indicative of interaction with the passenger side lane marker or the driver side lane marker.

The present disclosure provides an LDW system that operates even when lane lines are not visible such as when covered with snow or other reasons. The LDW system receives wheel speed signals and makes determinations whether the vehicle has entered a lane departure event based on the wheel speed signals. In particular, from the wheel speed signals, the LDW system can detect a frequency and signal amplitude of the rumble strip encountered. The frequency of the passenger side (shoulder) lane marker and the frequency of the driver side (centerline) lane marker are different. The LDW system can make a determination what rumble strip (should or centerline) that the vehicle is encountering and react to it. In examples, a signal is communicated to the HMI alerting the driver of a lane departure event and/or a correcting input can be communicated to the vehicle steering wheel.

Figure 1:
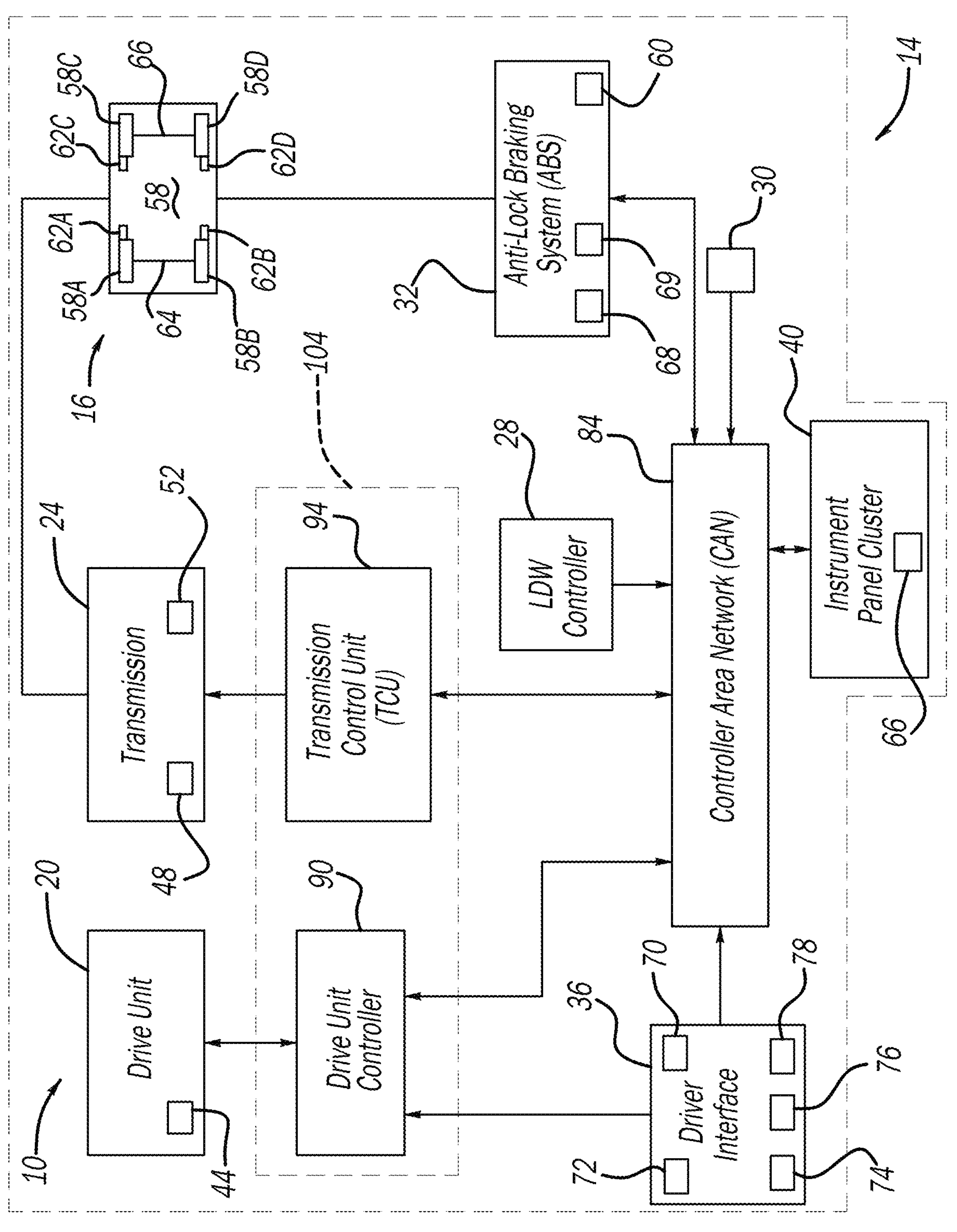
FIG. 1 is a schematic block diagram of an exemplary vehicle incorporating an LDW system according to the principles of the present disclosure.

With continuing reference to FIG. 1, an exemplary lane departure warning (LDW) system constructed in accordance to one example of the present disclosure is shown and generally identified at reference numeral 10. The LDW system 10 is associated with an exemplary vehicle 14 that delivers drive torque to a driveline 16 for propulsion. The LDW system 10 generally includes an LDW module or controller 28 that controls various vehicle components based on vehicle driving conditions received by sensors 30. The sensors 30 can include one or more cameras or radar systems or other devices that can sense a lane condition and provide a signal to the controller 28 indicative thereof.

The exemplary vehicle 14 includes a drive unit 20, a transmission 24, an anti-lock brake system (ABS) 32, a driver interface 36 and a human machine interface (HMI) or instrument panel cluster 40. The drive unit 20 can be a conventional internal combustion engine (ICE), an electric motor, or combinations thereof. The drive unit 20 includes a speed sensor 44. The transmission 24 includes various transmission speed sensors, such as input and output transmission shaft speed sensors 48 and various clutch engagement sensors 52, such as pressure sensors, to provide a signal to an associated control system indicative of engagement of an associated clutch.

The transmission 24 and ABS 32 are coupled or selectively coupled, directly or indirectly, to one or more wheels, collectively identified at 58 of vehicle 14, as is known in the art. Some or all of the wheels 58 can be drive wheels that receive torque input. The wheels 58A, 58B, 58C and 58D each have wheel speed sensors 62A, 62B, 62C and 62D. In the example shown, the front wheels 58A and 58B are selectively coupled by a front axle 64. Similarly, the rear wheels 58C and 58D are selectively coupled by a rear axle 66. The ABS 32 can additionally include or be configured to cooperate with a traction control system 68 and an electronic stability control system 69.

In the exemplary implementation illustrated, the ABS 32 is controlled to activate foundation brakes 60. The ABS 32 cooperates with the wheel speed sensors 62. The instrument panel cluster 40 includes various indicators, such as a low traction/low visibility light or indicator 66. The driver interface 36 includes a steering wheel 70 and a brake pedal 72. The driver interface 36 includes a driver input device, e.g., an accelerator pedal 74, for providing a driver input, e.g., a torque request, for drive unit 20. The driver interface 36 further includes an LDW settings input 76 where the driver can adjust various sensitivities of the LDW system 10. The driver interface 36 or vehicle interior also includes a transmission shift request device, such as a shift lever or rotary shifter 78, for the driver to request a desired transmission 24 gear.

One or more controllers are utilized to control the various vehicle components or system discussed above. In one exemplary implementation, various individual controllers are utilized to control the various components/systems discussed herein and are in communication with each other and/or the various components/systems via a local interface 84. In this exemplary implementation, the local interface 84 is one or more buses or other wired or wireless connections, as is known in the art. In the example illustrated in FIG. 1, the local interface 84 is a controller area network (CAN). The CAN 84 may include additional elements or features, which have been omitted for simplicity, such as controllers, buffers (cache) drivers, repeaters and receivers, among many others, to enable communications. Further, the CAN 84 may include address, control and/or data connections to enable appropriate communications among the components/systems described herein.

In the example illustrated in FIG. 1, the LDW system 10 can cooperate with a drive unit controller 90 for controlling the drive unit 20, and a transmission control unit (TCU) 94 for controlling the transmission 24. Both of the control units 90 and 94 as well as the ABS 32, driver interface 36, instrument cluster 40 and sensor 30 are in communication with CAN 84 and thus each other. It will be appreciated that while individual control units are discussed herein and shown in various Figures, the individual control units may also be optionally implemented in the form of one control unit, such as a powertrain or vehicle control unit, represented by broken line 104 in FIG. 1. Thus, it will be appreciated that while the discussion will continue with reference to the individual controllers discussed above, the discussion is equally applicable to the components of vehicle 14 being controlled by one controller.

Figures 2A, 2B, 2C:
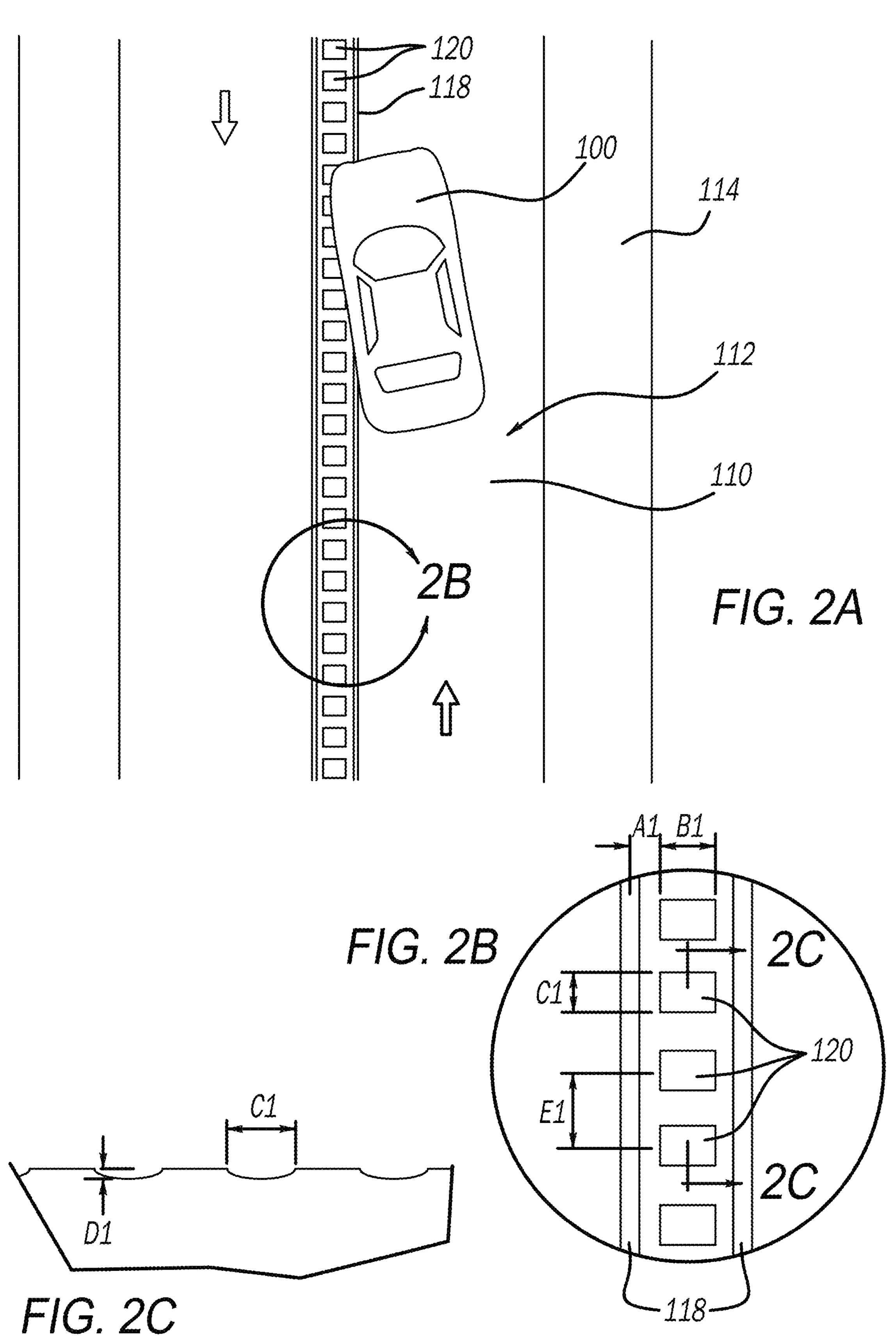
FIG. 2A is a plan view of exemplary vehicle encountering centerline rumble strips according to the principles of the present disclosure.
FIG. 2B is a detail view of a section of centerline rumble strips shown in FIG. 2A according to the principles of the present disclosure.
FIG. 2C is a sectional side view of the centerline rumble strips taken along lines 2C-2C of FIG. 2B according to the principles of the present disclosure.
Figures 3A, 3B, 3C:
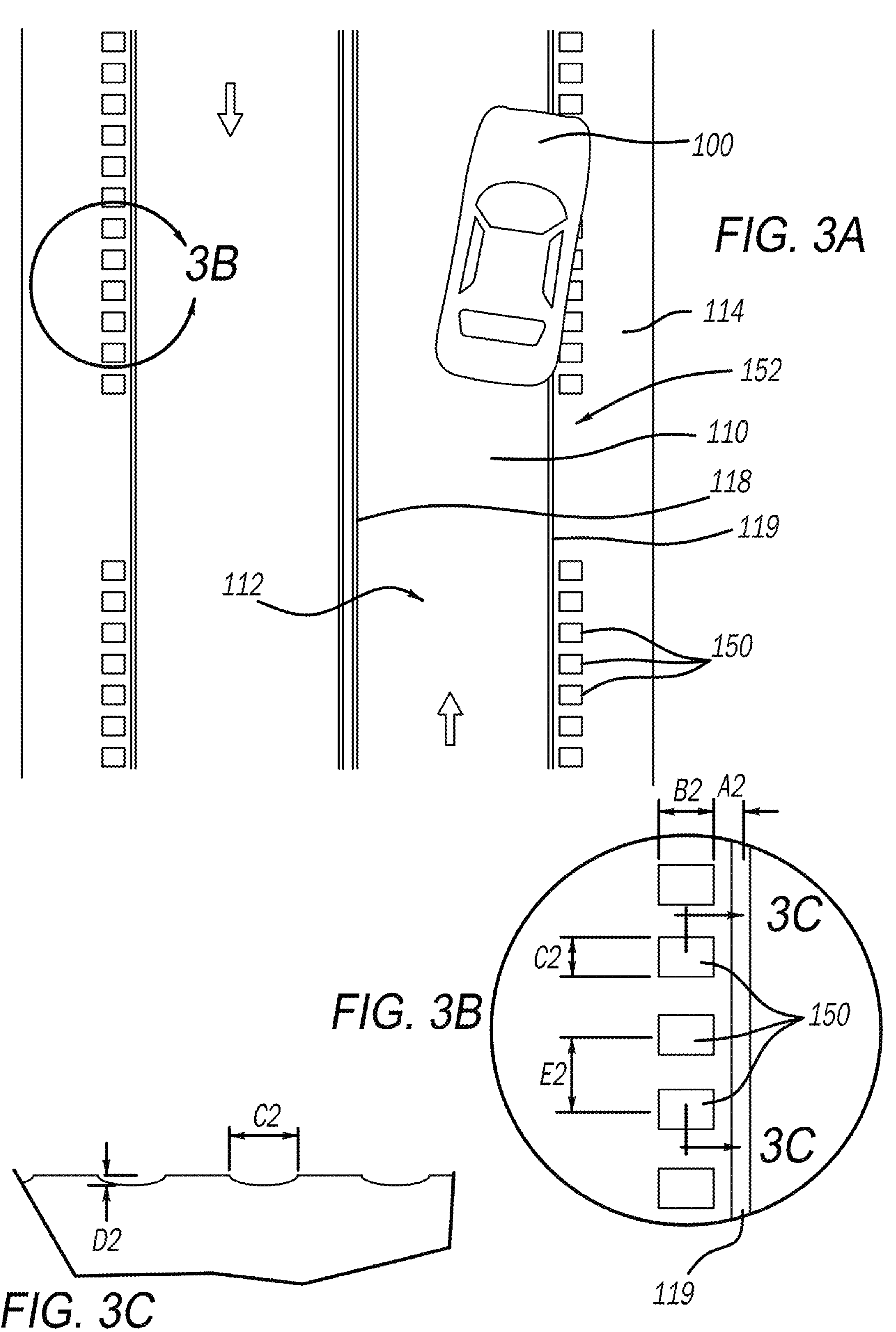
FIG. 3A is a plan view of exemplary vehicle encountering shoulder rumble strips according to the principles of the present disclosure.
FIG. 3B is a detail view of a section of shoulder rumble strips shown in FIG. 3A according to the principles of the present disclosure.
FIG. 3C is a sectional side view of the shoulder rumble strips taken along lines 3C-3C of FIG. 3B.

Referring now to FIGS. 2A-2C, and with reference back to FIG. 1, additional features of the present LDW system 10 will be described. FIG. 2A is a plan view of exemplary vehicle 100 driving along a road 110 in a lane defined between a centerline lane marker 118 and a shoulder lane marker 119 (FIG. 3A). The vehicle 100 is shown encountering centerline rumble strips 120. In the example shown, the centerline rumble strips 120 are provided within the centerline lane marker 118 of the road 110. The road 110 also includes a shoulder 114. The shoulder 114 can be defined as generally outboard of the shoulder lane marker 119. FIG. 2B is a detail view of a section of centerline rumble strips 120 shown in FIG. 2A. FIG. 2C is a sectional side view of the centerline rumble strips 120 taken along lines 2C-2C of FIG. 2B. In general, the centerline rumble strips 120 define an offset A1, a length B1, a width C1, a depth D1 (FIG. 2C) and a spacing E1. These known geometrical relationships are used in determining whether the vehicle 100 is encountering the centerline rumble strips 120.

Referring now to FIGS. 3A-3C, and with reference back to FIG. 1, additional features of the present LDW system 10 will be described. FIG. 3A is a plan view of exemplary vehicle 100 encountering shoulder rumble strips 150. In the example shown, the shoulder rumble strips 150 are provided within the shoulder 114, outboard of the shoulder lane marker 119 of the road 110. In some instances, the shoulder 114 may also present a gap 152 (FIG. 3A) in occurrences of the rumble strips 150. FIG. 3B is a detail view of a section of shoulder rumble strips 150 shown in FIG. 2A. FIG. 3C is a sectional side view of the shoulder rumble strips 150 taken along lines 3C-3C of FIG. 3B. In general, the shoulder rumble strips 150 define an offset A2, a length B2, a width C2, a depth D2 (FIG. 3C) and a spacing E2. These known geometrical relationships are used in determining whether the vehicle 100 is encountering the shoulder rumble strips 150 (or the centerline rumble strips 120).

The centerline rumble strips 120 and the shoulder rumble strips 150 are configured differently on the road 110. In general, the signals provided by the wheel speed sensors 62A, 62B, 62C and 62D when encountering the shoulder rumble strips 150 present a different characteristic (e.g., a lower frequency, or amplitude) compared to corresponding signals sent when encountering the centerline rumble strips 120. Based on the difference in frequency and/or amplitude, a determination is made by the LDW controller 28 which rumble strips, the centerline rumble strips 120, or the shoulder rumble strips 150 are being encountered.

As a result, a corrective action can be made such as a signal being communicated to the HMI 40 alerting the driver of a lane departure event and/or a correcting input being communicated to the vehicle steering wheel 70. In examples, the LDW controller 28 can also make determinations as to which of the centerline rumble strips 120 or the shoulder rumble strips 150 are being encountered based on a determination that a sensed frequency has been interrupted based on encountering the gap 152.

Figure 4:
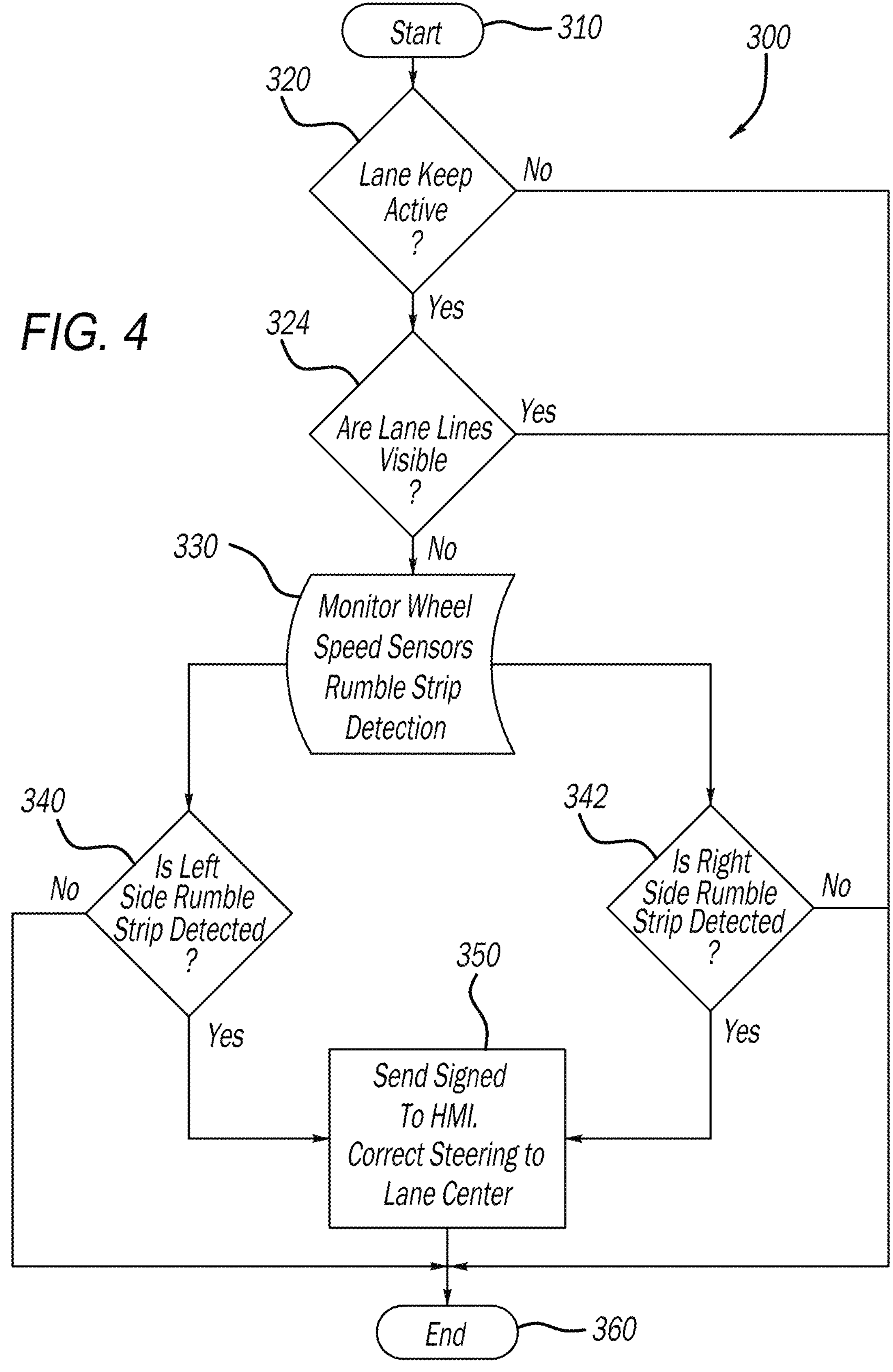
FIG. 4 illustrates an exemplary flow diagram for implementing the LDW system in accordance with the principles of the present disclosure.

Turning now to FIG. 4, an example functional block diagram or method of operating the LDW system 10 is shown and generally identified at reference numeral 300. The method begins at 310. At 320, control determines whether lane departure warning is active. If not, control ends at 360. If control determines that lane departure warning is active, control determines whether lane lines (centerline 118, shoulder lane line 119) are visible at 324. In examples, control receives signals from the sensors 30 indicative of lane detection. If the lane lines are visible, control ends at 360. If the lane lines are not visible, control monitors wheel speed sensors 62A, 62B, 62C and 62D.

Based on a sensed discrepancy in signals (e.g., frequency, amplitude, etc.), control can make determinations as to what rumble strips (centerline 120, or shoulder 150) are being encountered. At 340 control determines whether the left (centerline) side rumble strip 150 is detected. At 342 control determines whether the right (shoulder) side rumble strip 120 is detected. If neither is detected, control ends at 360. If either the left or right side rumble strip is detected, control can perform a corrective action. In examples, the corrective action can include communicating a signal to the HMI 40 indicative of either the centerline or shoulder rumble strip 120, 150 being encountered. Control can also provide a signal to the steering system 70 to provide an opposite steering input (away from the detected rumble strip) and back toward the lane 112.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A lane departure warning (LDW) system that implements a corrective action strategy based on driving conditions for a vehicle, the LDW system comprising:

a drive unit that provides drive torque to at least one wheel of the vehicle wheels for propelling the vehicle;

a first, second, third and fourth wheel speed sensor that provides a wheel speed signal for a respective first, second, third and fourth vehicle wheel; and a controller that implements the corrective action strategy, wherein the controller:

receives the wheel speed signals from the respective vehicle wheels, wherein each of the wheel speed signals are indicative of a wheel speed of the respective vehicle wheel;

determines, based on the wheel speed signals, whether at least one wheel speed signal satisfies a frequency threshold indicative of a lane departure event; and performs the corrective action strategy based on the determination at least one wheel speed signal satisfies the frequency threshold, wherein the corrective action strategy comprises at least one of:

(i) communicating a message to a human machine interface (HMI) in the vehicle indicative of a lane departure event; and (ii) communicating a signal to a steering system to provide a corrective steering input.

2. The LDW system of claim 1, wherein the controller is configured to determine, based on the wheel speed signals, whether at least one wheel speed signal satisfies a frequency threshold indicative of a lane departure event, the lane departure event indicative of a wheel speed frequency that corresponds to encountering a centerline rumble strip.

3. The LDW system of claim 2, wherein communicating a message to a human machine interface (HMI) comprises communicating a message indicative of the vehicle encountering a centerline lane marker.

4. The LDW system of claim 3, wherein communicating a signal to a steering system comprises providing a corrective steering input in a direction away from the detected centerline lane marker.

5. The LDW system of claim 1, wherein the controller is configured to determine, based on the wheel speed signals, whether at least one wheel speed signal satisfies a frequency threshold indicative of a lane departure event, the lane departure event indicative of a wheel speed frequency that corresponds to encountering a shoulder rumble strip.

6. The LDW system of claim 5, wherein communicating a message to a human machine interface (HMI) comprises communicating a message indicative of the vehicle encountering a shoulder lane marker.

7. The LDW system of claim 6, wherein communicating a signal to a steering system comprises providing a corrective steering input in a direction away from the detected shoulder lane marker.

8. The LDW system of claim 1, wherein the controller is configured to assign a first frequency threshold indicative of a centerline lane departure event and a second frequency threshold indicative of a shoulder lane departure event, wherein the first and second frequency thresholds are distinct and based on a spacing between adjacent rumble strips of the centerline rumble strips and adjacent rumble strips of the shoulder rumble strips.

9. A method for implementing a lane departure warning (LDW) system strategy, the method comprising:

receiving, at a controller, a first, second, third and fourth wheel speed signal for a respective first, second, third and fourth vehicle wheel, wherein each of the wheel speed signals are indicative of a wheel speed of the respective vehicle wheel; and implementing, at the controller, the corrective action strategy, including:

determining, based on the wheel speed signals, whether at least one wheel speed signal satisfies a frequency threshold indicative of a lane departure event; and performing the corrective action strategy based on the determination at least one wheel speed signal satisfies the frequency threshold, wherein the corrective action strategy comprises at least one of:

(i) communicating a message to a human machine interface (HMI) in the vehicle indicative of a lane departure event; and (ii) communicating a signal to a steering system to provide a corrective steering input.

10. The method of claim 9, wherein the controller is configured to determine, based on the wheel speed signals, whether at least one wheel speed signal satisfies a frequency threshold indicative of a lane departure event, the lane departure event indicative of a wheel speed frequency that corresponds to encountering a centerline rumble strip.

11. The method of claim 10 wherein communicating a message to a human machine interface (HMI) comprises communicating a message indicative of the vehicle encountering a centerline lane marker.

12. The method of claim 11 wherein communicating a signal to a steering system comprises providing a corrective steering input in a direction away from the detected centerline lane marker.

13. The method of claim 9, wherein the controller is configured to determine, based on the wheel speed signals, whether at least one wheel speed signal satisfies a frequency threshold indicative of a lane departure event, the lane departure event indicative of a wheel speed frequency that corresponds to encountering a shoulder rumble strip.

14. The method of claim 13 wherein communicating a message to a human machine interface (HMI) comprises communicating a message indicative of the vehicle encountering a shoulder lane marker.

15. The method of claim 14 wherein communicating a signal to a steering system comprises providing a corrective steering input in a direction away from the detected shoulder lane marker.

16. The method of claim 9 wherein the controller:

assigns a first frequency threshold indicative of a centerline lane departure event and a second frequency threshold indicative of a shoulder lane departure event, wherein the first and second frequency thresholds are distinct and based on a spacing between adjacent rumble strips of the centerline rumble strips and adjacent rumble strips of the shoulder rumble strips.

* * * * *